Patented Oct. 12, 1943

2,331,696

UNITED STATES PATENT OFFICE 2,331,696

DRILLING MUD TREATMENT

Philip H. Jones, Redondo Beach, Calif., assignor to Union Oil Company of California, Los Angeles, Calif., a corporation of California No Drawing. Application February 16, 1942, Serial No. 431,058

7 Claims. (Cl. 252—8.5)

This invention relates to the preparation, conditioning and recovery of drilling muds in general and relates particularly to the re-conditioning or reclaiming of well drilling muds which have become contaminated with cement during cementing operations as in oil well drilling. This application in a continuation in part of my copending application Serial No. 256,304 filed Feb. 14th, 1939, which in turn is a continuation-in-part of my application Serial No. 150,745, filed June 28, 1937 which in turn is a continuation-in-part of my application Serial No. 130,735, filed March 13, 1937. This application is also a continuation-in-part of my application Serial No. 213,214, filed June 11, 1938.

Mud which has been contaminated with cement is termed "cement cut" and such "cement cut" mud is injured materially with respect to many of the functions which it is required to perform.

A poor quality mud forms a thick permeable mud cake upon the walls or surfaces of penetrated formation and allows at the same time a relatively large loss of water from the drilling mud by seepage or filtration into the penetrated formation.

In oil well drilling operations, for example, this may result in contamination of the adjacent penetrated producing oil sands with subsequent impaired oil production rates. Also, certain formations are greatly weakened structurally by the ingress of water.

The structural strengths of most formations that are penetrated by the drill are sufficient to prevent the walls of the hole from sloughing or caving. However, many such formations lose structural strength when wet with water and when so wet cave or slough into the hole. Frequently such action causes seizing of the drill pipe or tools so that they cannot be moved and costly fishing jobs result. It is, therefore, of great importance to prevent the loss of water from the drilling mud to the formations drilled. The mud cake formed by such poor quality muds may also at times be of sufficient thickness to obstruct the movement and even cause seizure of the drilling tools in the bore hole.

A high quality mud, on the other hand, forms a thin but highly impervious mud layer upon the penetrated formation surfaces which allows a relatively low loss of water from the drilling fluid to the formation. The high quality mud appears to have good colloidal properties which not only contribute to the before mentioned desirable qualities but also serve to impart the requisite thixotropic and plastic characteristics for the proper support of the drill cuttings so that they can be lifted readily without settling from the bore hole by the circulated medium.

The desirable quality of drilling mud has therefore, in this respect, been defined as that property of the mud which allows a minimum loss of water to the formation, while at the same time forming an impervious mud layer or cake of minimum thickness upon the penetrated formation surfaces.

A further desirable quality in drilling muds is a sufficiently low viscosity to permit easy pumping and circulation.

The relative performance qualities of muds as they relate to the above mentioned formation penetration and mud cake formation characteristics can be determined by subjecting natural and artificial formation samples to contact with the drilling muds under question under actual drilling operations and under correlated test conditions simulating actual drilling well conditions but where the quantities of water penetrating the artificial formations and the thickness of the mud cakes can be readily measured. I find furthermore that these characteristics can be determined by a simple filtration test as hereinafter described. These test indications were obtained and correlated with the actual results obtained in drilling wells as explained hereinafter. The viscosities of the muds are determined as hereinafter described.

It has been discovered that drilling muds which have been contaminated by contact or admixture with cement during cementing operations in a well usually have subsequent to such contact, poor performance characteristics in accordance with the quality definition given hereinbefore. Moreover, such cement cut muds often have extremely high viscosities which causes difficulty in circulation, imparts gas-cutting tendencies and prevents the proper release of cuttings.

Cement, as is well known, contains a complex mixture of oxides of calcium, magnesium, iron, aluminum and silicon. Of these compounds, calcium oxide or lime is present in greatest quantity. Calcium sulphates or gypsum may also be present in small quantities to act as a controlling agent in the setting reaction rate. Therefore, when cement is mixed with an excess of water as in the case of contact with drilling mud in cementing operations, the soluble portions of the cement dissolve in the water, forming therein a fairly high concentration of di-valent positive calcium ions associated with negative hydroxide ions.

Minor quantities of the di-valent magnesium and tri-valent ions of aluminum and iron from the cement usually are also present in solution in the water in the drilling mud.

The presence of these ions appears to cause a flocculation of the colloidal material in the mud and thus to deprive it of its essential formation sealing properties. At the same time the viscosity of the mud is greatly increased by these impurities to the extent that circulation of the mud becomes difficult and gas-cutting is facilitated.

It has been discovered that in general cement cut muds or other similarly contaminated muds can be reclaimed by treating them with carbon dioxide. It has furthermore been discovered that the quantity of the reagent used in such treatment should be such as to bring the physical characteristics of the mud as above described within certain ranges of value which I have found to be essential in practice.

The most important physical property of the mud is its ability to seal formations against infiltration of water, and as a result of extensive research I have found that this property can be measured by a simple filtration test. The sealing properties of the mud I find to depend on the character of the mud cake or filter cake formed when the mud is pressed against a membrane or filter permeable to water, rather than on the character of the membrane or filter. Consequently, I find that in testing the sealing properties of mud I may use either samples of the actual formation concerned or a filter paper as the permeable membrane, and in either case obtain test values showing the same general relationships between the muds tested. In practice, I test the sealing properties of muds by placing 600 ml. of mud in a 3-inch internal diameter cylindrical filter provided at its lower end with a Reeve Angel No. 214 filter paper and filter the mud under air pressure of 100 pounds per square inch.

The test measurements consist in determining the total filtrate water obtained during the first hour of pressure of fitration, the average rate of filtration during the last half of this hour and the thickness and texture of the mud filter cake formed during the hour of filtration. Numerous correlations between such tests and actual drilling experience with the same muds have shown that the muds yielding a total filtrate of less than 30 ml. using a 600 ml. sample in an hour's filtration period at a temperature of 80° F. are very satisfactory. On the other hand, muds yielding a total filtrate in excess of 45 ml. under similar circumstances have been found dangerous to use, and in particular when muds of this character are used in drilling through formations which are readily softened by penetration of water, cave-ins frequently occur. Again, muds displaying average filter rates in excess of 25 or 30 ml. per hour for the last half hour of filtration have been found objectionable in use. Also, a mud which is satisfactory for drilling operations will under conditions of this test deposit a filter cake of not over one quarter inch in thickness and of a soft plastic or gelatinous texture; whereas unsatisfactory muds tend to deposit a thick, tough mud cake. I have discovered, therefore, that in treating a drilling mud to give it properties insuring satisfactory performance that it is desirable that the treated mud, when tested as above described, yields a total filtrate of not over 40 to 45 ml. at an average rate during the second half-hour period of not over 25 to 30 ml. per hour and that the deposited cake be preferably less than one-quarter inch in thickness and preferably of a soft gelatinous texture.

It is desirable that the viscosity of the mud should be less than 45 seconds as determined by the Marsh funnel viscometer, a description of which can be found in an article by H. N. Marsh, entitled, "Properties and Treatment of Rotary Mud" appearing in the Transaction of the A. P. I. M. E. Petroleum Development and Technology, page 237 et seq. in 1931. I find that the funnel viscosities in excess of 45 lead to impaired circulation and increased danger of gas cutting.

It has been discovered that in general cement cut muds or other similarly contaminated muds which are of low quality with respect to their mud cake forming characteristics and ability to prevent loss of water to formations can be reclaimed by treatment with carbon dioxide.

In the practice of this invention, in the rotary method of oil well drilling for example, the treating reagent is added to the circulating mud stream at any convenient point such as at a point adjacent to the mud pump suction inlet in the mud sump. Thorough mixture of the thus introduced reagent may be assured by rapid recirculation of the mud from the mud sump through the spare slush pump. In the case of employing carbon dioxide as the treating agent, it is added to the mud by blowing it into the mud stream at or near the said mud pump suction inlet. During treatment, mud samples are taken from the circulating mud stream at frequent intervals and tested in the before-mentioned filtration testing apparatus to determine when the treatment has effected the required degree of recovery of the desirable formation penetration and mud cake forming characteristics.

An example of the practical application and results of the process of this invention is illustrated by a number of typical test data in Table I. The method employed for making these performance tests was as outlined above. In this instance, however, sand was used in place of the filter paper and the duration of each test was thirty minutes instead of one hour. The drilling mud to which the process and tests were applied was cement-cut mud from the Dominguez field, California; the test formation comprised Temblor sand from Kettleman Hills. The temperature and pressure of the test mud was 80° F. and 100 pounds per square inch, respectively.

*Table I*

| Test No. | Milligrams of sodium carbonate per gram of solids in mud | $CO_2$ added to adjust pH | Tests on mud | | | Water penetration through test formation ml. | | Thickness of mud cake |
|---|---|---|---|---|---|---|---|---|
| | | | Weight | Funnel visc. | pH | Total in 30 min. | Rate during last 15 min./ml. per hour | |
| | | | Lb./cu. ft. | Seconds | | | | Inches |
| 1 | 0 | 0 | 69.0 | 33 | 12.3 | 78.0 | 104.0 | 0.30 |
| 2 | 0 | + | 66.0 | 20 | 10.0 | 49.0 | 52.0 | 0.25 |
| 3 | 3 | 0 | 68.0 | 25 | 12.3 | 32.6 | 38.4 | 0.25 |
| 4 | 12 | + | 65.1 | 20 | 10.0 | 29.0 | 33.6 | 0.125 |
| 5 | 20 | + | 66.2 | 20 | 10.3 | 26.0 | 29.6 | 0.125 |

The improvement in characteristics of the cement-cut mud is evidenced by the decreased viscosity as shown in column 5, principally by the data of the last two right-hand columns of Table I, where it is apparent that the water penetration rate and mud cake formation thickness characteristics of the mud were improved by treatment with either sodium carbonate or carbon dioxide alone but especially by the combined treatment by both sodium carbonate and carbon dioxide. Large numbers of tests such as those in Table I correlated with actual well drilling experiences and results of the application of the invention thereto have shown that the combination of sodium carbonate together with sufficient quantity of carbon dioxide, to adjust the hydrogen ion concentration (acidity or pH value) to a pH value between 8 and 11.5 averaging about 10, or the use of sodium bicarbonate alone for this purpose produce the most satisfactory results.

As a valuable alternative to the process as described above, I may add the aforementioned reagents to fresh mud not only to improve its immediate quality but also to immunize the mud against future contamination with cement. Thus, for example, I may add to a mud sufficient carbon dioxide to precipitate the calcium that would otherwise be introduced during future cementing operations and subsequent operations of drilling through the resultant cement plug. The mud may be thus immunized by prior addition of suitable reagents as above described or combinations of such reagents.

An example of the practical application of the process of this invention is illustrated by results obtained by its application to drilling wells and by correlated typical test data as outlined in Table I.

For example, trouble may be encountered in removing and inserting drilling tools in a drilling well subsequent to cementing operations which have contaminated the circulating mud. Sticking of drilling tools in a well is believed to be caused by the penetration of formations subject to swelling or caving when they become permeated with water from the drilling mud. Sticking of the tools is also attributed to the obstructing of the drilled hole with the excessively thick mud cake formed by drilling muds of poor quality. Whatever the reasons for these difficulties in drilling may be, they are believed to be associated with the use of a drilling mud of poor quality as defined hereinbefore which allows a substantial quantity of the water to penetrate the formations and which causes the formation of a thick mud cake. When drilling through a low pressure producing formation a drilling mud of poor quality allows the contamination of the oil sands with water from the drilling mud which acts to reduce the permeability thereof and results in reduced future rates of production.

When, as stated hereinbefore, trouble is encountered in removing and inserting drilling tools in a drilling hole, a sample of the circulating drilling mud from this well may be tested by subjecting an artificial or natural test formation to contact with the said mud sample under pressure in accordance with the method described hereinbefore. If the mud has been seriously contaminated with the cement the test will show that it has lost a considerable portion of its desirable formation sealing properties. The mud sample thus tested and found to be contaminated with cement is then treated with carbon dioxide gas. The thus treated mud sample is then again subjected to the test and is ordinarily found after such treatment to have been restored to its proper formation sealing value. The circulating drilling mud in the well from which the test mud sample is taken is then treated in accordance with the data obtained from the before described test and the following drilling operations will prove to be substantially freer from drilling tool sticking tendencies.

An example of the valuable savings which may be effected by the application of this invention is evident by the following: 1200 barrels of cement cut mud which would ordinarily be discarded was withdrawn from a drilling well in Dominguez field, California, and placed in a storage tank. This cement cut mud, upon withdrawal, was a jelly-like mass entirely unfit for drilling operations, and upon testing prior to treatment showed a viscosity too high to permit funnel viscosity determinations to be made successfully. Eighty-five pounds of carbon dioxide gas was mixed into this mud by blowing it into the suction inlet of a mud circulating pump connected to the said storage tank resulting in a reduction of the funnel viscosity to 25. The resultant reconditioned mud was then suitable for further utilization in drilling operations.

The muds to which this invention is applicable comprises in general water suspensions of clayey solids usually associated with colloidal or colloid forming substances in sufficient quantity to impart permanence to the suspension, the proper viscosity and plasticity characteristics for carrying cuttings and the requisite formation sealing properties. Such muds may for example be one of the well known Wilmington Slough, Dominguez Slough, Coalinga Red, Frazier Mountain or other muds or blends thereof of recognized merit. The muds may be of the bentonite type or may contain additions of bentonite or other colloidal materials.

I have also found in the preparation of certain muds, particularly low calcium content muds, such as Wilmington Slough mud, which appear to be initially contaminated and exhibit poor performance characteristics at the outset that they do not always yield directly to the hereinbefore described treatment. I have discovered, however, that such muds if they are first treated with a quantity of cement, or its equivalent, will then respond more readily to subsequent treatment and the thus treated mud is usually found to have characteristics which are superior to those of the original mud and also superior to those obtainable by the aforementioned treatment alone.

Furthermore, I have discovered that the improvement to be gained by first cement cutting the mud followed by the aforementioned treatment is not confined to those muds which are initially resistant to the treatment but that it extends to many other muds ordinarily responsive to such treatment and also to those muds ordinarily considered to be of good quality.

The reason for this improvement is not entirely understood but it appears to be the result of an initial partial flocculation caused by the cement cutting treatment followed by a partial deflocculation caused by the subsequent treatment.

Best results appear to be obtained by first treating the mud with a quantity of cement, or its equivalent chemical such as sodium or calcium hydroxide, in sufficient quantity to partially flocculate the mud whereupon it assumes the consistency of a semi-gel followed by treatment with carbon dioxide to partially deflocculate the mud and thus greatly reduce the viscosity. The thus treated mud is found to exhibit a substantially reduced viscosity and filter rate.

It thus appears that in order to reduce the viscosity and filter rate of a mud by a chemical treatment it is first desirable to flocculate the mud partially into a gel or a semi-gel form, in which state the particles are larger than they were originally. Then the addition of a reagent which has some peptizing action to deflocculate the enlarged particles results in a decrease of viscosity below the original.

It is preferable to first add the flocculating agent such as cement, then the deflocculating agent such as carbon dioxide in this order as hereinbefore described because the physical and chemical charges are thereby almost immediately effected. However, the order of treatment may be reversed or the treating agents added simultaneously but when the treatment of the mud is performed in this manner the mud generally reacts very slowly to the treatment requiring in the order of twenty-four hours of agitation to complete the desired chemical and physical changes, until the chemical treatment reaches substantial completeness the mud has a gel-like consistency which makes its pumping and circulation through the drill stem impractical. Hence, it is obviously impractical in the field to chemically treat the mud except in the before described order, that is, first with the flocculating agent followed by the deflocculating agent.

The flocculating agents which have been found useful are sodium carbonate, sodium hydroxide, sodium chloride, lime, calcium chloride, Portland cement, sodium silicate, magnesium chloride, aluminum chloride, aluminum sulphate, alum, iron chloride, iron sulfate, sodium orthophosphate, sodium pyrophosphate, sodium oxalate, sodium tartrate, sodium aluminate, sodium ammonium phosphate, sodium citrate, sodium borate and sodium fluoride.

In general the quantity of reagent necessary to use may be determined by the stoichiometrical relationships of the reactions involved, based on an analysis of the water associated with the mud or a knowledge of the type of contamination. In other instances such as have been described herein the quantity or reagent is adjusted to give a certain pH value; thus $CO_2$ is added to a cement cut mud until the pH falls between 8-11.5. In any case the reagent may be added in a quantity such that the desired characteristics of the mud, such as yield point, viscosity and filter rate are obtained by tests as described hereinbefore, for example until the filter rate is reduced to 45 ml./hr. and/or until the funnel viscosity is approximately 28.

The foregoing is illustrative and not to be taken as limiting the invention, which may include any method which accomplishes the same within the scope of the appended claims:

I claim:
1. In the drilling of a well with the circulation of a drilling fluid which becomes contaminated with cement, the method of conditioning the cement-cut drilling fluid which comprises treating the drilling fluid with carbon dioxide.

2. A method for improving the filtration characteristics of an untreated drilling mud which had not been previously employed as a drilling mud in connection with the drilling of wells which comprises treating the mud with a sufficient quantity of a flocculating agent adapted to effect flocculation of the mud to a semi-gel consistency and thereby initially producing a mud having a reduced filtration characteristic and subsequently treating the flocculated mud with a sufficient quantity of carbon dioxide to effect substantial deflocculation to produce a drilling mud having a lower filtration characteristic than said untreated mud.

3. A method for improving the filtration characteristics of an untreated drilling mud which had not been previously employed as a drilling mud in connection with the drilling of wells which comprises treating the mud with a sufficient quantity of calcium hydroxide to effect flocculation of the mud to a semi-gel consistency and thereby initially producing a mud having a reduced filtration characteristic and subsequently treating the flocculated mud with a sufficient quantity of carbon dioxide to effect substantial deflocculation to produce a drilling mud having a lower filtration characteristic than said untreated mud.

4. A method for treating drilling mud to produce a drilling fluid which will possess desirable viscosity, wall-building and water loss properties when used in the process of drilling a well which comprises treating said mud with carbon dioxide in an amount sufficient to lower the filter rate to less than approximately 45 ml. in the first hour of filtration.

5. A method for treating drilling mud to produce a drilling fluid which will possess desirable viscosity, wall-building and water loss properties when used in the process of drilling a well which comprises treating said mud with carbon dioxide in an amount sufficient to lower the filter rate to less than approximately 25 to 30 ml. per hour as measured during the second half hour of filtration.

6. A method according to claim 2 in which the flocculating agent comprises sodium carbonate.

7. A method according to claim 2 in which the flocculating agent comprises sodium pyrophosphate.

PHILIP H. JONES.